(No Model.) 2 Sheets—Sheet 2.
H. C. KIRK, J. T. BRAYTON, H. R. WADER & M. OULEHEN.
MAGNIFYING DEVICE FOR THERMOMETERS.
No. 307,775. Patented Nov. 11, 1884.
Fig.8. Fig.9.
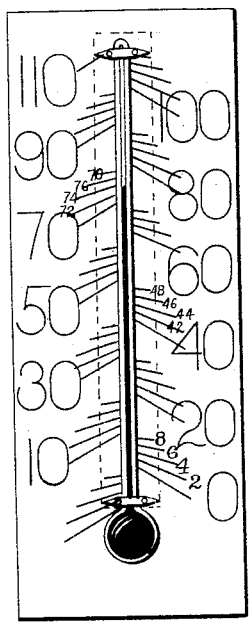 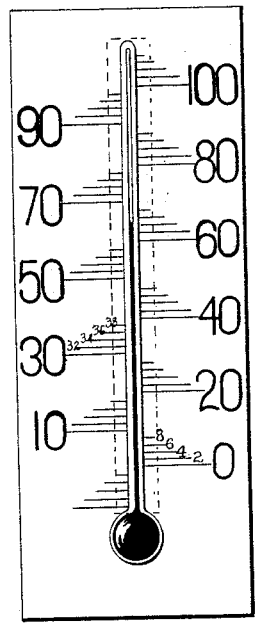
Fig.10
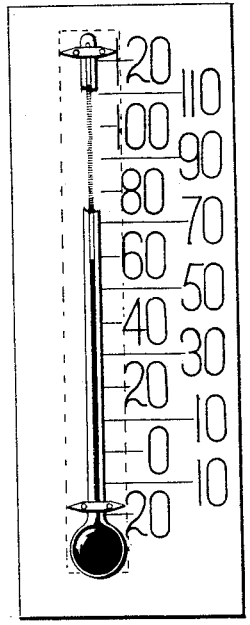
WITNESSES.
Jas. F. DuHamel.
Walter S. Dodge.
INVENTORS.
Hyland C. Kirk.
James T. Brayton.
Herbert R. Wader.
Michael Oulehen.
by Dodge & Son, Attys

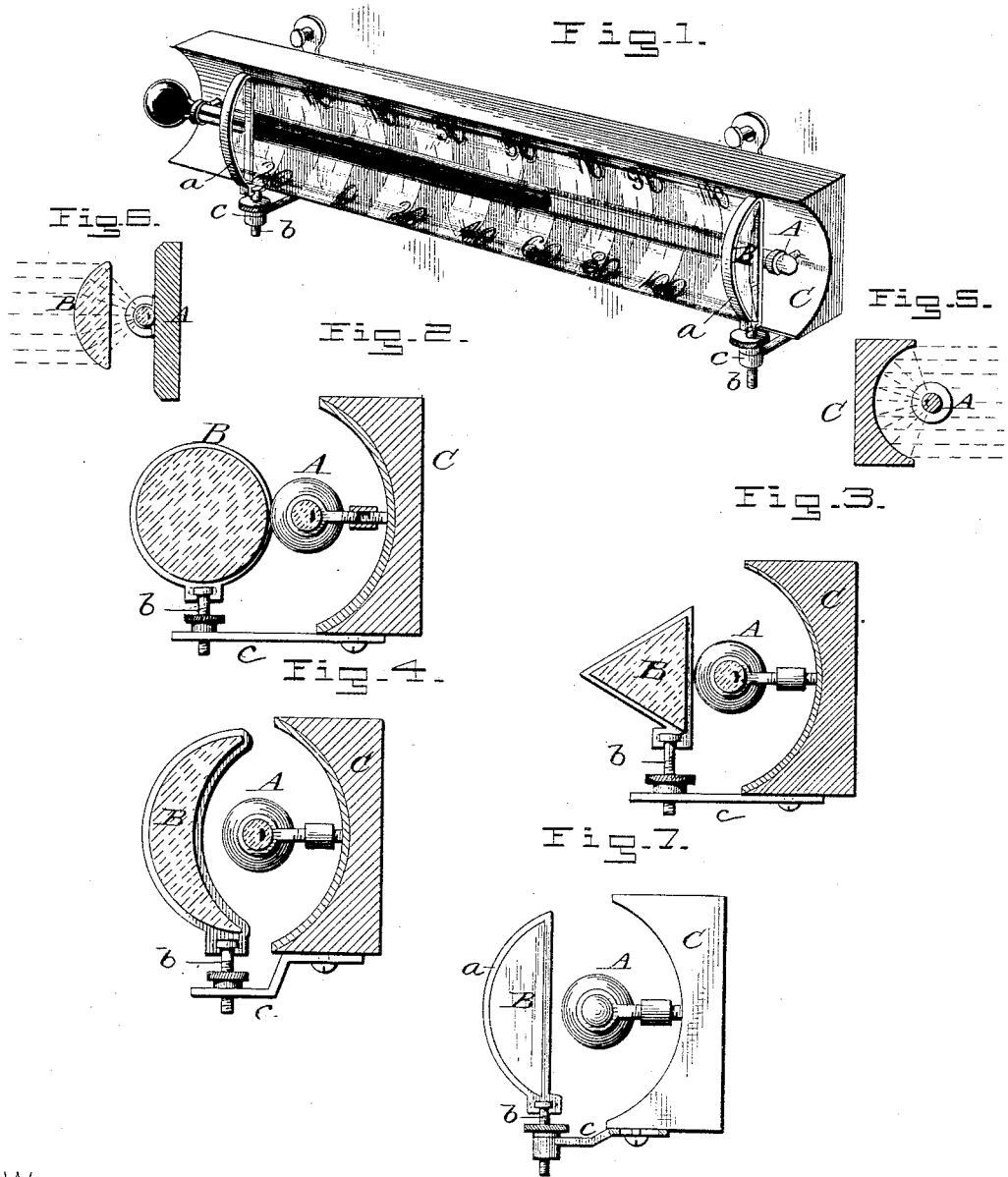

UNITED STATES PATENT OFFICE.

HYLAND CLARE KIRK, JAMES TOMLINSON BRAYTON, HERBERT ROSS WADER, AND MICHAEL OULEHEN, OF GENEVA, NEW YORK.

MAGNIFYING DEVICE FOR THERMOMETERS.

SPECIFICATION forming part of Letters Patent No. 307,775, dated November 11, 1884.

Application filed April 3, 1884. (No model.)

*To all whom it may concern:*

Be it known that we, HYLAND C. KIRK, JAMES T. BRAYTON, HERBERT R. WADER, and MICHAEL OULEHEN, all of Geneva, in the county of Ontario and State of New York, have invented certain Improvements in Thermometers and Like Instruments, of which the following is a specification.

This invention relates to thermometers and like instruments; and it consists in combining with the tube thereof an independent magnifying device (one or more) to magnify the liquid-column or the liquid-column and figures or graduations, and enable them to be seen at a distance.

This invention further consists in means for adjusting the tube and magnifier one in relation to the other, in order to vary the relative positions of the magnifying device and tube or scale.

The magnifying device may consist either of a reflector of proper shape placed behind or at one side of the tube, or of a lens, prism, or enlarging device placed in front of said tube, as hereinafter more fully pointed out, it being important, however, that the magnifying device be separated from and adjustable in relation to the tube and scale.

In the accompanying drawings, Figure 1 is a perspective view of the improved device provided with both a reflector in rear of the tube and a lens or magnifying device in front thereof. Figs. 2, 3, 4, 5, and 6 represent cross-sections of the device in different forms; and Fig. 7 an end view showing the manner of adjusting the parts one relatively to the other; Figs. 8, 9, and 10, views illustrating different forms of scale.

The purpose of this invention is to permit the markings of thermometers and like instruments to be read at a considerable distance and with certainty; and to this end it consists in extending from end to end of the tube or scale of such instrument either a reflector adapted by reason of its shape to magnify or enlarge the markings, or of a lens, prism, or transparent body adapted to enlarge such markings by producing a divergence of the rays of light passing through it, such magnifying device, reflector, or lens being made adjustable to and from the tube to insure a proper focus, and to cause the column to be seen from whatever point or direction it may be desired. In practice I prefer to place the tube in a horizontal position, though it is not essential; but in whatever position the tube may be placed the reflector, lens, or other magnifying device, will, of course, be placed in a position parallel therewith, or subtantially so.

Referring again to the drawings, A represents a thermometer-tube, which may be graduated or not, as preferred, placed in a horizontal position, and preferably in front of a scale containing the graduations and figures indicating said graduations of as large size as is convenient in an instrument of given size. These markings may be advantageously arranged alternately on opposite sides of the tube, as indicated in Fig. 1, in order to enable the figures to be made larger than can be done where all are on the same side of the tube, though I make no claim to this feature, broadly considered. The lines passing from the graduations to the figures may be straight and parallel, curved or divergent from a common center, as may be found most convenient, which latter arrangement is disclaimed herein, being the subject-matter of claims now pending in an application filed by James T. Brayton, on the 17th day of April, 1883, Serial No. 91,986.

B represents a magnifying-glass or other transparent body, preferably of concavo-convex form, but which may be plano-convex, double convex, prismatic, or of other form in cross-section, as indicated in the several figures. The lens or magnifier, being interposed between the scale and tube and the eye of the observer, serves to magnify both the fluid-column and the graduations or markings of the scale and those of the tube, if there be any, enabling them to be seen at a considerable distance. In the same manner a reflector, C, of concave form, placed in rear or to one side of the tube, serves to magnify or enlarge the markings thereof in a manner that will be readily understood. By combining in the one instrument the tube, reflector, and lens, the reflector may be made to enlarge the markings or figures, and to throw such enlargements upon the lens, which in turn will serve to further magnify and enlarge them as well as the liquid-column.

To facilitate the reading of the scale at a distance the space between different figures or markings may be differently colored, so as more plainly to mark the dividing-lines between the different spaces or sections, as indicated in Fig. 1.

In order that the magnifying device, whether it be a lens or reflector, may be raised and lowered, so as to direct the rays up and down, or to one or the other side in case the instrument is used in a vertical position, such magnifier is carried by metal clips or bands $a$ in which are swiveled set-screws $b$, passing through arms or brackets $c$, which support the lens, and which are themselves slotted and adjustable, as shown in Figs. 2 and 7, to permit the lens or magnifier to be adjusted to or from the tube and scale. In like manner an adjustment of the tube to and from the reflector may be made by the threaded sleeve, or equivalent means, on the tube-supporting brackets, as shown in Fig. 2. The tube A in the same manner may be made adjustable relatively to the lens or to the reflector, or the reflector may be made adjustable relatively to the tube, though it is preferred in practice to make the lens adjustable; or, if only the tube and reflector be used, to make the tube adjustable relatively to the reflector.

Various modifications of the device will readily suggest themselves to the skilled maker of instruments of this character, which modifications are within the spirit of our invention. We therefore do not limit ourselves to the particular construction and arrangement of parts herein shown and described.

In order to permit the reading of the figures from a distance, they may be arranged as in Fig. 1, or as in Figs. 8, 9, and 10.

In Figs. 8 and 9 the lines intervening between the ten-degree marks are made of unequal lengths, to give room for figures of larger size than could be used if placed directly in line one above another or side by side, a further space being secured in Fig. 8 by causing such intermediate lines to diverge.

The lenses may be cheaply and advantageously made of tubular form and filled with alcohol, water, or other transparent liquid.

In order to secure good results, particularly when a reflector is employed, it is essential that the light be free to pass through the tube, hence the common mode of forming a contrasting enamel background for the column in or upon the tube is impracticable or undesired. We therefore form upon the scale-plate, directly in line with and behind the fluid-column, a contrasting line of the same width as the column, so that the line and the column will be magnified equally, and being of contrasting colors, will show clearly the meeting point of the two colors, that of the column and that of the background, and enable a person to ascertain at a considerable distance the height of the column. This arrangement avoids the necessity of widening the colored background beyond the width of the tube, and thus prevents such color from showing at the sides of the column, as would otherwise occur to great disadvantage of the instrument.

Having thus described our invention, what we claim is—

1. A thermometer or like instrument provided with a tube, a concave or magnifying reflector in the rear of said tube, and a magnifying lens or transparent body in front of the tube, said parts being formed independent of each other, but combined and arranged to operate substantially as described.

2. A thermometer adapted to be read from a distance, consisting of a fluid-tube, and an independent magnifying lens or body placed in front of said tube, and extending lengthwise of the same parallel with the fluid-column, substantially as shown and described.

3. In combination with a thermometer-tube, a magnifying device, and means, substantially such as described and shown, for adjusting said parts one in relation to the other.

4. In combination with a thermometer-tube, a magnifying device placed in line therewith, and carried by set-screws $b$, passing through arms or brackets $c$, and serving to adjust the parts one in relation to the other.

5. The herein-described thermometer, consisting of a fluid-tube, a scale-plate in rear of said tube, and a magnifying device in front of said tube and scale-plate, substantially as shown and described.

6. In combination with a fluid-tube and a magnifying device arranged substantially as shown and described to magnify the fluid-column, a scale-plate having its figures placed at one side of the tube and out of line with each other, whereby figures may be used of such size as to be read from the same distance as the magnified column.

7. In combination with the tube of a thermometer or like instrument, a background having a line of a width no greater than that of the bore of the tube, and of a color contrasting with that of the liquid in the tube, substantially as and for the purpose explained.

HYLAND CLARE KIRK.
JAMES TOMLINSON BRAYTON.
HERBERT ROSS WADER.
MICHAEL OULEHEN.

Witnesses:
S. R. REYNOLDS,
C. N. HEMIUP.